United States Patent [19]

Harmetz et al.

[11] 3,873,597

[45] Mar. 25, 1975

[54] 2-BROMO-2-BROMOMETHYLGLUTARONITRILE

[75] Inventors: Ronald Harmetz, Randolph; Roger J. Tull, Metuchen, both of N.J.

[73] Assignee: Merck & Co., Inc., Rahway, N.J.

[22] Filed: Nov. 20, 1973

[21] Appl. No.: 417,647

Related U.S. Application Data

[60] Continuation-in-part of Ser. No. 131,445, April 5, 1971, abandoned, which is a division of Ser. No. 879,519, Nov. 24, 1969, Pat. No. 3,644,380.

[52] U.S. Cl............ 260/465.7, 260/294.9, 424/304
[51] Int. Cl......................................... C07c 121/20
[58] Field of Search................................ 260/465.7

[56] References Cited
UNITED STATES PATENTS

| | | | |
|---|---|---|---|
| 3,562,311 | 2/1971 | McClure | 260/465.8 R |
| 3,567,759 | 3/1971 | Tullio | 260/465.8 R |

FOREIGN PATENTS OR APPLICATIONS

| | | | |
|---|---|---|---|
| 1,097,360 | 1/1968 | United Kingdom | 260/465.7 |
| 842,193 | 6/1952 | Germany | 260/465.7 |

OTHER PUBLICATIONS

Groggins, Unit Processes in Organic Synthesis, 5th Ed., 1958, pages 240–241.

C. A.; Subject Index for Vols. 51–55, (1957–1961), page 5304s.

Moyer, et al., J. Org. Chem., 31, (1966), pp. 1094–1098.

Kondratenko, et al., C. A.; 68, (1968), 12440k.

*Primary Examiner*—Joseph P. Brust
*Attorney, Agent, or Firm*—Edmunde D. Riedl; J. Jerome Behan; Rudolph J. Anderson, Jr.

[57] ABSTRACT

In the synthesis of 3-cyanopyridine from non-heterocyclic starting materials, namely, 2-methyleneglutaronitrile the intermediate 2-bromo-2-bromomethylglutaronitrile is obtained, which intermediate compound is useful as an antibacterial and antifungal agent.

1 Claim, No Drawings

2-BROMO-2-BROMOMETHYLGLUTARONITRILE

SUMMARY OF THE INVENTION

This application is a continuation-in-part of U.S. Ser. No. 131,445, filed Apr. 15, 1971 and now abandoned which is a division of U.S. Ser. No. 879,519 filed Nov. 24, 1969, now U.S. Pat. No. 3,644,380 issued Feb. 22, 1970 and relates to new processes for the preparation of that compound. More particularly, it relates to the intermediate 2-halo-2-halomethylglutaronitrile, especially the 2-bromo-2-bromomethylglutaronitrile, which is an extremely useful antibacterial and antifungal compound as disclosed in the copending application of Lederer, et al., Ser. No. 102,197 filed Dec. 28, 1970, now U.S. Pat. No. 3,833,731, the disclosure of which is hereby incorporated herein.

BACKGROUND OF THE INVENTION

3-Cyanopyridine (nicotinonitrile) is a valuable intermediate useful in the preparation of nicotinic acid (niacin) and nicotinamide. The novel 2-bromo-2-bromomethyl glutaronitrile has activity against bacteria, fungi and algae when employed at appropriate levels of concentration and may be used to inhibit growth of these organisms. It will be obvious to those skilled in the art that the required effective concentration will vary with particular organisms and in particular applications. In general, however, effective fungicidal, bactericidal and algicidal response is obtained when the 2-bromo-2-bromomethylglutaronitriles is employed in concentrations ranging from 0.5 and 1,000 p.p.m. (parts per million).

DESCRIPTION OF THE INVENTION

The present invention provides a facile method for obtaining 3-cyanopyridine (IV) from readily available starting materials as seen in the following flow sheet:

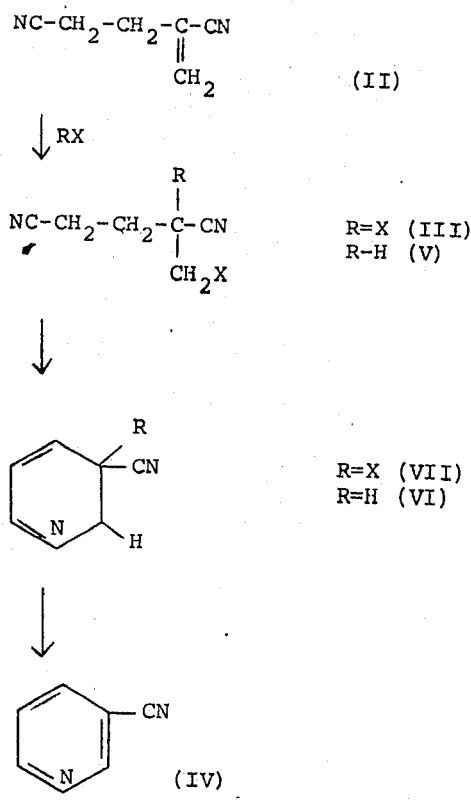

In accordance with the foregoing flow sheet, 3-cyanopyridine is prepared from 2-methylene glutaronitrile.

2-Methyleneglutaronitrile (II), prepared by known methods, is reacted with a compound of the type RX where X is a halogen and R is either hydrogen or X. The reaction is a simple addition across a double bond forming III where R is X and V where R is H.

III and V are treated with a Lewis acid in a cyclization reaction such that the nitrile group farthest from the halomethyl group reacts with that group, displacing the halogen (X) and forming VI where R is H and VII where R is X.

HR is eliminated from each of these compounds forming the desired 3-cyanopyridine. The elimination is carried out by treatment with alkali in the case where R is equal to halogen and catalytically in the case where R is equal to hydrogen.

In accordance with one embodiment of our invention, 2-methyleneglutaronitrile is halogenated by reaction with chlorine, bromine or iodine to obtain the corresponding 2-halo-2-halomethylglutaronitrile which is then cyclized by reaction with a Lewis acid and the resulting reaction product is treated with a base to produce the desired 3-cyanopyridine.

The halogenation is readily effected by intimately contacting the nitrile with the halogen, preferably at temperatures below about 30°C. The reaction can be carried out in the presence of a non-reactive solvent, although generally we find that a solvent is unnecessary. The halogenated product obtained, for example, by passing chlorine through the 2-methyleneglutaronitrile while maintaining the reaction mixture at a temperature 15°–20°C. can be used directly in the next step; or, if desired, can be purified by distillation under reduced pressure.

The cyclization step is effected by heating the intermediate dihalo compound with a Lewis acid. Although any Lewis acid can be used in this process, we prefer to use stannic chloride, aluminum chloride, titanium chloride, or boron trifluoride etherate since maximum yields of 3-cyanopyridine are obtained with these acids under optimum conditions. The cyclization proceeds at temperatures from 80° to 250°C. although, generally, we prefer to carry out the reaction at a temperature of 125° to 200°C. The time required for this step will vary, depending upon the temperature and the Lewis acid used, but usually the reaction is complete in 2 – 5 hours. Although the reaction can be carried out without a solvent, we find that it is most conveniently effected in a suitable solvent medium, preferably one having a boiling point of at least 150°C. Examples of suitable solvents that might be mentioned are nitrobenzene or halogenated hydrocarbons such as ortho dichlorobenzene. Although the reaction can be effected at atmospheric pressure, we find that better yields are obtained when the reaction is effected in a sealed vessel.

After completion of the cyclization step, the resulting reaction mixture is extracted with water to obtain an aqueous solution containing 3-halo-3-cyanodihydropyridine which, when treated with a base such as an alkali metal hydroxide, is converted to the desired 3-cyanopyridine.

In a modification of the above steps, 3-cyanopyridine can be prepared in one reaction vessel, without isolating any intermediates and, in fact, preparing the 2-methylene glutaronitrile itself by the known procedure of dimerizing acrylonitrile with a trialkyl phosphine such as tricyclohexyl phosphine in an inert solvent, preferably with a boiling point of less than 100°C. such as tetrahydrofuran. The 2-methyleneglutaronitrile prepared in situ is combined with a halogen, preferably in equimolar amounts to form the 2-halo-2-halomethyl glutaronitrile. The solvent is evaporated in vacuo and the residue treated with a solvent preferably a low boiling one (about 100°C) capable of azotroping water from the system, and being non-reactive to Lewis acids. Benzene and toluene are suitable for this purpose. The Lewis acid is added to the residue and the reaction vessel is sealed and heated to affect the cyclization to 3-cyanopyridine. The reaction can be carried out at temperatures of 80°–250°C. for 2–5 hours.

In another embodiment of our invention, 2-methyleneglutaronitrile is converted to 2-halomethylglutaronitrile by hydrohalogenation with a hydrogen halide. The resultant halo compound is cyclized with a Lewis acid to dihydro-3-cyanopyridine. This can be subsequently dehydrogenated with heat and a suitable catalyst to the desired 3-cyanopyridine.

The hydrohalogenation step can be carried out without a solvent at a temperature of about 0°–5°C. using for example hydrogen chloride in excess of a single molar amount. The recovered 2-halomethylglutaronitrile can be used as it comes from the reaction vessel or distilled to purify it.

Cyclization of the 2-halomethylglutaronitrile is carried out as described for the 2-halo-2-halomethylglutaronitrile except the reaction mixture, on cooling, is treated with water and extracted with a non-polar, water immiscible organic solvent which dissolves the dihydro 3-cyano pyridine. Chloroform and ethyl ether are solvents that have proven to be of merit. After evaporation of the organic solvent, the dihydro-3-cyanopyridine can be used as is or purified by vacuum distillation.

The dihydro-3-cyanopyridine is converted to 3-cyanopyridine by dehydrogenating using a suitable catalyst.

Metallic catalysts, such as the noble metals, have been found to give the best results. The reaction may also include a hydrogen scavenger which chemically absorbs the hydrogen as it is set free by the catalyst. Organic compounds with one or more non-aromatic unsaturations are preferred, with indene, cyclohexene, or stilbene being particularly good for this purpose. The reaction is run at a temperature of from room temperature to 150°C. in a solvent, inert to reaction at the reaction temperature. Decalin has been found to be a highly suitable solvent.

The following examples are presented to illustrate the process of this invention. They should not be construed as limitations thereof.

EXAMPLE 1

Preparation of 2-chloro-2-chloromethylglutaronitrile 106 gms. (1.0 mole) of 2-methyleneglutaronitrile is placed in a flask, fitted with a stirrer, calcium chloride drying tube and subsurface gas inlet tube. The material is cooled to 15°–20°C. and chlorine gas is added with agitation at such a rate that the temperature does nt exceed 20°C. When an equimolar amount of chlorine is absorbed, the addition is stopped and the mixture stirred for an additional hour. The product, 2-chloro-2-chloromethylglutaronitrile (b.p. 136–138 at 1.5 mm) can be purified by distillation under reduced pressure or can be used in Example 3 below as is.

EXAMPLE 2

Preparation of 2-bromo-2-bromomethylglutaronitrile 106 g. (1.0 m.)-2-methyleneglutaronitrile and 160.0 g. (1.0 m.) liquid bromine are combined and stirred at a temperature of 25°–27°C. for 3 days. The reaction mixture is then treated with aqueous sodium bisulfite and extracted with 3 × 100 cc. ethyl ether. The ether extracts are washed with 3 × 50 cc. aqueous sodium bicarbonate and dried with anhydrous magnesium sulfate. The ether is filtered to remove the magnesium sulfate, and evaporated to give crude 2-bromo-2-bromomethylglutaronitrile (m.p. 45°–53°C) which is purified by recrystallization from isopropanol yielding pure material m.p. 51.5° – 52.5°C.

Iodine may be used in a similar manner as above to yield 2-iodo-2-iodomethylglutaronitrile.

EXAMPLE 3

Conversion of 2-chloro-2-chloromethylglutaronitrile to 3-cyanopyridine

A mixture containing 177 gms. (1.0 mole) of 2-chloro-2-chloromethylglutaronitrile, 260 gms. (1.0 mole) of stannic chloride and 1.0 liters of orthodichlorobenzene is heated at 150°C. in a sealed reaction vessel for 3 hours. The mixture is then cooled to 10° – 20°C. and extracted with 3 × 100 ml. of water to obtain an aqueous solution of 3-chloro-3-cyanodihydropyridine. The combined aqueous extracts are made basic with aqueous sodium hydroxide and then extracted with 3×100 cc. ether. Evaporation of the ether to dryness and recrystallization of the residue from petroleum ether gives 80 gms. of 3-cyanopyridine.

Following the procedure of the above example using a molar equivalent of aluminum chloride, titanium chloride or boron trifluoride etherate in place of stannic chloride, good yields of 3-cyanopyridine are obtained. m.p. 50°–51°C.

EXAMPLE 4

Conversion of 2-chloro-2-chloromethylglutaronitrile to 3-cyanopyridine 177 g. (1.0m) of 2-chloro-2-chloromethylglutaronitrile and 260 g. (1.0m) stannic chloride are heated at 150°C. for 3 hours. The reaction mixture is cooled to 0°–5°C., made basic with 20 percent sodium hydroxide to a pH of from 8–11, and extracted with 3 × 100 cc. ethyl ether. The ethyl ether extracts are evaporated to dryness and the residue recrystallized from petroleum ether to give 3-cyanopyridine.

EXAMPLE 5

Preparation of 2-chloromethylglutaronitrile from 2-methyleneglutaronitrile 1.06 gms. (1.0 m.) of 2-methyleneglutaronitrile and 1.4 gms. of diethyl amine hydrochloride are placed in a flask fitted with a stirrer, thermometer, calcium chloride drying tube and subsurface gas inlet tube. The mixture was cooled to 0°–10°C. and anhydrous hydrogen chloride gas is then admitted through the gas inlet tube, with agitation, until one molar equivalent of hydrogen chloride is absorbed. The solution is then warmed to 27°C. and hydrogen chloride gas addition is continued for an additional hour. The mixture is diluted with 650 ml. of chloroform and extracted with 2 × 150 ml. of 7.5 percent aqueous sodium bicarbonate solution. The combined aqueous extracts are extracted once with 100 ml. of chloroform. The combined chloroform extracts are extracted with 100 ml. of water and then dried over anhydrous magnesium sulfate. The magnesium sulfate drying agent is removed by filtration and the filtrate evaporated under reduced pressure to remove the chloroform. The residue, which is 2-chloromethylglutaronitrile, can be purified by distillation under reduced pressure or used as is in the next step. The product has a boiling point of 105°C. at 0.08 mm. mercury pressure.

EXAMPLE 6

Conversion of 2-chloromethylglutaronitrile to dihydro-3-cyanopyridine

A mixture containing 143 gms. (1.0 mole) of 2-chloromethylglutaronitrile, 260 gms. (1.0 mole) of stannic chloride and 1 liter of nitrobenzene is heated at 175°C. in a sealed reaction vessel for 3 hours. The reaction mixture is cooled to 10°–20°C. and extracted with 3 × 200 ml. of dilute aqueous hydrochloric acid. The combined aqueous extracts are made basic with 20 percent sodium hydroxide and then extracted with 3 × 100 cc. benzene. Evaporation of the benzene extracts affords dihydro-3-cyanopyridine which can be further purified by distillation under reduced pressure or used in its present purity as described in Example 8.

EXAMPLE 7

Conversion of 2-chloromethylglutaronitrile to dihydro-3-cyanopyridine 143 g. (1.0 m.) of 2-chloromethylglutaronitrile and 260 g. (1.0 m.) stannic chloride are heated at 150°C. for 3 hours. The reaction mixture is cooled, made basic with 20 percent aqueous sodium hydroxide and extracted with 3 × 100 cc. benzene. Evaporation of the benzene extract yields crude dihydro-3-cyanopyridine which can be used as is in the next example or can be further purified by distillation under reduced pressure.

Following the procedure of Example 4, but using aluminum chloride, titanium tetrachloride, or boron trifluoride etherate in place of stannic chloride, there is produced dihydro-3-cyanopyridine in an analagous manner.

EXAMPLE 8

Conversion of dihydro-3-cyanopyridine to 3-cyanopyridine

A mixture containing 10.6 gms. (0.1 mole) of dihydro-3-cyanopyridine, 58.0 gms. (0.5 mole) of indene, 3 gms. of 10 percent palladium on carbon and 200 ml. of Decalin is refluxed for 24 hours in a suitable container. The mixture is then cooled and filtered to remove the catalyst and other impurities. The filtrate is then extracted with 4 × 50 ml. of dilute hydrochloric acid. The aqueous layer is made basic with 20 percent aqueous sodium hydroxide and extracted with 3 × 100 ml. of ethyl ether. Evaporation of the ether extracts and recrystallization of the residue from petroleum ether gives 3-cyanopyridine. m.p. 50°–51°C.

EXAMPLE 9

Prepartion of 3-cyanopyridine directly from acrylonitrile 120 g. (2.26 m.) acrylonitrile and 200 ml. tetrahydrofuran are combined with stirring. The mixture is heated to reflux and 8 g. (.029 m.) tricyclohexylphosphine dissolved in 50 ml. of tetrahydrofuran is slowly added over 3 hours maintaining the solution at reflux. When the addition is complete, the solution is refluxed an additional hour and then cooled to 15°–20°C. Chlorine is bubbled into the reaction until one molar equivalent is added. The solvent is removed in vacuo and benzene is added with stirring, and evaporated to remove any traces of water present. Stannic chloride (286 g. 1.1 m.) is added to the residue, the reaction vessel is sealed and heated to 150°C. for 3 hours. The reaction mixture is cooled, made basic with 20 percent aqueous sodium hydroxide and extracted with ether. The ether extracts are dried with anhydrous magnesium sulfate, filtered and evaporated. The residue is recrystallized from petroleum ether to recover 3-cyanopyridine. m.p. 50°–51°C

What is claimed is:

1. 2-Bromo-2-bromomethylglutaronitrile.

* * * * *